United States Patent [19]
Wilke et al.

[11] 3,741,033
[45] June 26, 1973

[54] VEHICLE EMERGENCY BRAKE ACTUATING MECHANISM

[75] Inventors: David J. Wilke, Williamsport, Pa.; James R. Kraus, Hagerstown, Md.

[73] Assignee: Pennsylvania Wire Rope Corporation, Williamsport, Pa.

[22] Filed: Dec. 29, 1971

[21] Appl. No.: 213,494

[52] U.S. Cl. .................................... 74/512, 74/517
[51] Int. Cl. ............................................. G05g 1/14
[58] Field of Search .................. 74/512, 516, 517, 74/518, 519, 520, 479, 480, 481, 483, 105, 106

[56] References Cited
UNITED STATES PATENTS

| | | | |
|---|---|---|---|
| 2,975,654 | 3/1961 | Vigmostad | 74/520 |
| 2,884,803 | 5/1959 | Willis | 74/512 |
| 3,011,361 | 12/1961 | Hinsey | 74/479 X |

Primary Examiner—Charles J. Myhre
Assistant Examiner—F. D. Shoemaker
Attorney—Rupert J. Brady, James G. O'Boyle et al.

[57] ABSTRACT

A vehicle emergency brake actuating mechanism wherein an over-center toggle linkage is operatively connected between the foot pedal lever and the brake actuating cable, whereby pressure can be applied to the emergency brake pedal to selectively brake the vehicle in a manner similar to the conventional hydraulic brake system, or to fully actuate the emergency brake by forcing the toggle linkage to the over-center locked position. A brake release lever is provided for moving the toggle linkage to the release position, and a resilient connection is provided between the toggle linkage and the end of the brake actuating cable to insure a constant tension on the emergency brake system.

10 Claims, 5 Drawing Figures

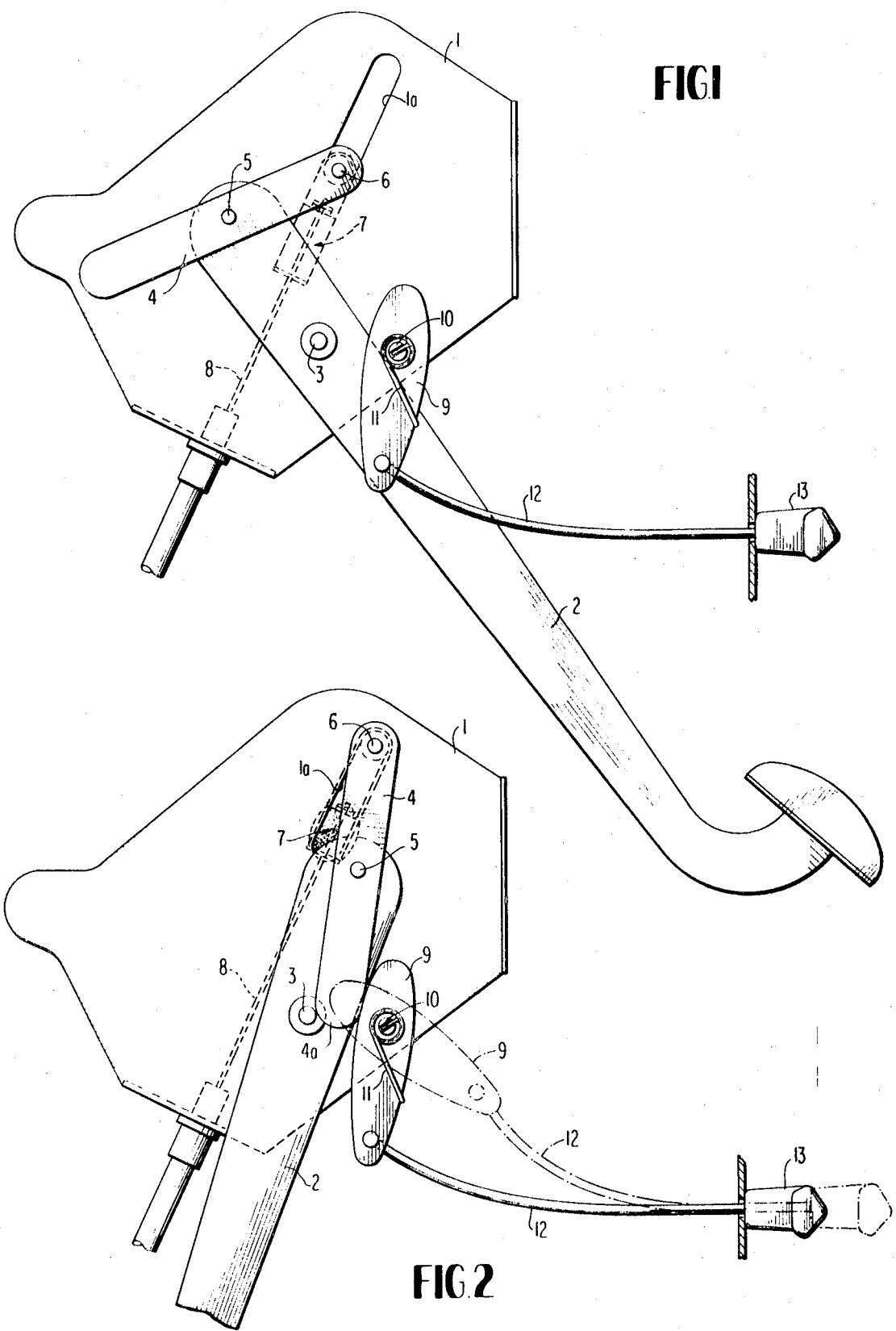

VEHICLE EMERGENCY BRAKE ACTUATING MECHANISM

BACKGROUND OF THE INVENTION

The conventional emergency brake systems in most of today's vehicles employ a ratchet type mechanism for locking the emergency brake in position when the operator's foot is removed from the emergency brake foot pedal. The degree to which the brake is applied depends upon the position to which the brake pedal is pushed and how hard it is depressed.

While these conventional emergency brake systems have been satisfactory for their intended purpose, they have been subject to certain limitations, in that the emergency brake could not be employed as a conventional brake, as a back-up braking system upon failure of the hydraulic brake system, since the emergency brake foot pedal will lock and remain in the position it is placed when the operator's foot is removed therefrom.

Furthermore, the strength of the operator plays an important part in the actuation of conventional emergency brake actuating mechanisms since the holding force of the emergency brake depends upon the pressure applied to the emergency brake pedal, and the position to which it is depressed.

To overcome the disadvantages experienced in conventional emergency brake actuating mechanisms, the brake actuating mechanism of the present invention has been devised and comprises, essentially, an over-center toggle linkage operatively connected between the foot pedal lever and the brake actuating cable, whereby when the toggle linkage is on one side of the fixed, center pivot the emergency brake pedal is in the released position allowing the operator to intermittently jog press the foot pedal to actuate the emergency brake in a manner similar to the conventional hydraulic brake system. When the brake pedal is fully depressed, the toggle linkage is displaced to the opposite side of the fixed, center pivot thereby actuating the emergency brake to the locked position. A brake release mechanism is provided for moving the toggle linkage to the released side of the center pivot, and a resilient connection is provided between the toggle linkage and the end of the brake actuating cable to insure a constant tension on the emergency brake system.

BRIEF DESCRIPTION OF THE DRAWINGS

FIG. 1 is a side elevational view of one embodiment of the brake actuating mechanism of the present invention, showing the mechanism in the released position;

FIG. 2 is a side elevational view of the mechanism illustrated in FIG. 1, showing the mechanism in the locked position;

Figure 3:
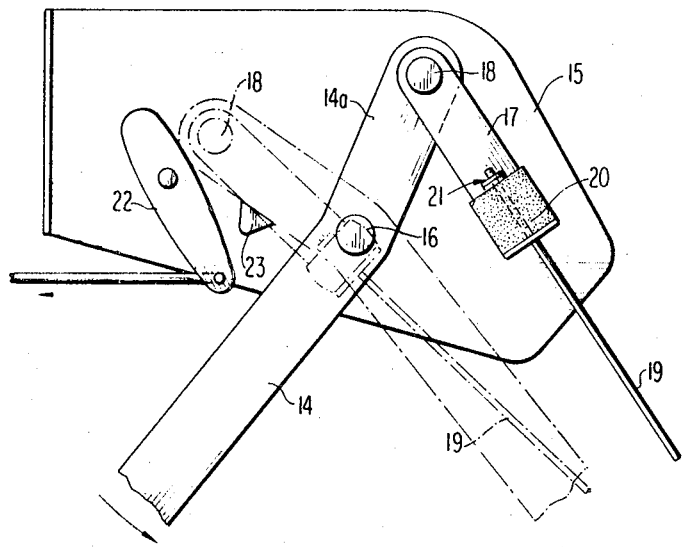
FIG. 3 is a side elevational view of another embodiment of the brake actuating mechanism of the present invention, the released position illustrated in solid lines, the locked position in phantom.
Figure 5:
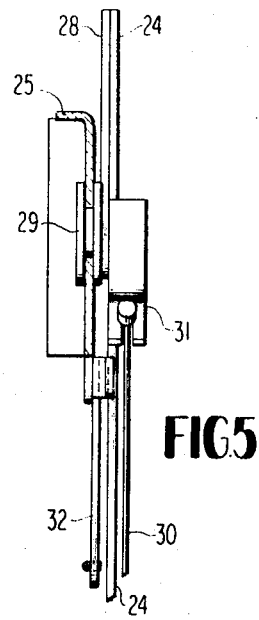
FIG. 5 is a view taken along line 5—5 of FIG. 4.

Referring to the drawings and more particularly to FIGS. 1 and 2, one embodiment of the emergency brake actuating mechanism of the present invention is illustrated, which comprises a fixed bracket 1 having a foot pedal lever 2 pivotally connected to one side thereof at 3. A lever 4 is pivotally connected to the end of the foot pedal lever as at 5, the outer end of the lever 4 being provided with a pin 6 which extends to the other side of the bracket through a slot 1a formed in the bracket. A resilient connector 7, to be described more fully hereinafter, is secured between the pin 6 and one end of the brake actuating cable 8. By this construction and arrangement, the foot pedal lever 2 and lever 4 provide an over-center toggle linkage, such that so long as the movable pivot 5 remains on one side of the fixed, center pivot 3, as shown in FIG. 1, the foot pedal remains in the released position whereby the emergency brake may be applied in a manner similar to the conventional brake pedal in the hydraulic brake system. In other words, the operator may jog or intermittently apply pressure to the emergency brake pedal to brake the vehicle.

To apply the emergency brake, for instance, in a parking situation, sufficient pressure is applied to the brake pedal lever 2 to cause the pivot 5 to move to the other side of the fixed pivot 3, as shown in FIG. 2, to thereby move the toggle linkage to the locked position. The tension of the brake cable 8 acting on the outer end of lever 4 applies a force on the lever tending to urge the lever in a counter-clockwise direction about pivot 5, whereby the toggle linkage is maintained in locked position.

A release lever 9 is pivotally connected to the bracket 1 through pin 10 and is biased to the position shown in FIG. 1 by a torsion spring 11 having one end engaging the release lever and the opposite end secured to the pivot pin 10. A pull cable 12, having a suitable handle 13, is connected to one end of the release lever 9, the opposite end of the release lever being engaged by the free end 4a of lever 4 when the toggle linkage is in the locked position, as shown in FIG. 2. To release the toggle linkage, the release cable 12 is pulled, thereby pivoting the release lever 9 to the position shown in phantom in FIG. 2. The free end of the release lever 9, abutting the free end 4a of lever 4, thus cams the toggle linkage to the release side of the pivot 3, to thereby release the emergency brake foot pedal lever 2, as shown in FIG. 1.

Another embodiment of the toggle linkage-type brake actuating mechanism is illustrated in FIG. 3 wherein the brake pedal lever 14 is provided with an offset end portion 14a. The brake pedal lever 14 is pivotally connected to the bracket 15 as at 16, and a lever 17 is pivotally connected to the outer end of the offset portion as at 18. The brake actuating cable 19 is connected to the free end of the lever 17 through a resilient connector comprising a rubber block 20 secured to the end portion of lever 17, the cable 19 slidable through the rubber block and held therein by a nut and washer assembly 21 threaded on the end portion of the cable. This resilient connector is identical to the resilient connector 7 employed in the embodiment shown in FIGS. 1 and 2, and it insures a constant tension on the brake system even though variations of length within the system might occur due to extreme temperature variations, or varying chassis load conditions.

The released position of the toggle linkage is shown in solid lines in FIG. 3, and the locked position in phantom, wherein the movable pivot 18 has been moved to the other side of the center line of the fixed pivot 16.

The tension of the cable 19 urges the offset portion 14a against the release lever 22, and a stop member 23 mounted on the bracket 15. To release the toggle linkage, the release lever is pivoted in a clockwise direction to cam the offset portion 14a in a clockwise direction about pivot 16, thereby causing the movable pivot 18 to move to the opposite side of the center-line of the fixed pivot 16.

Figure 4:
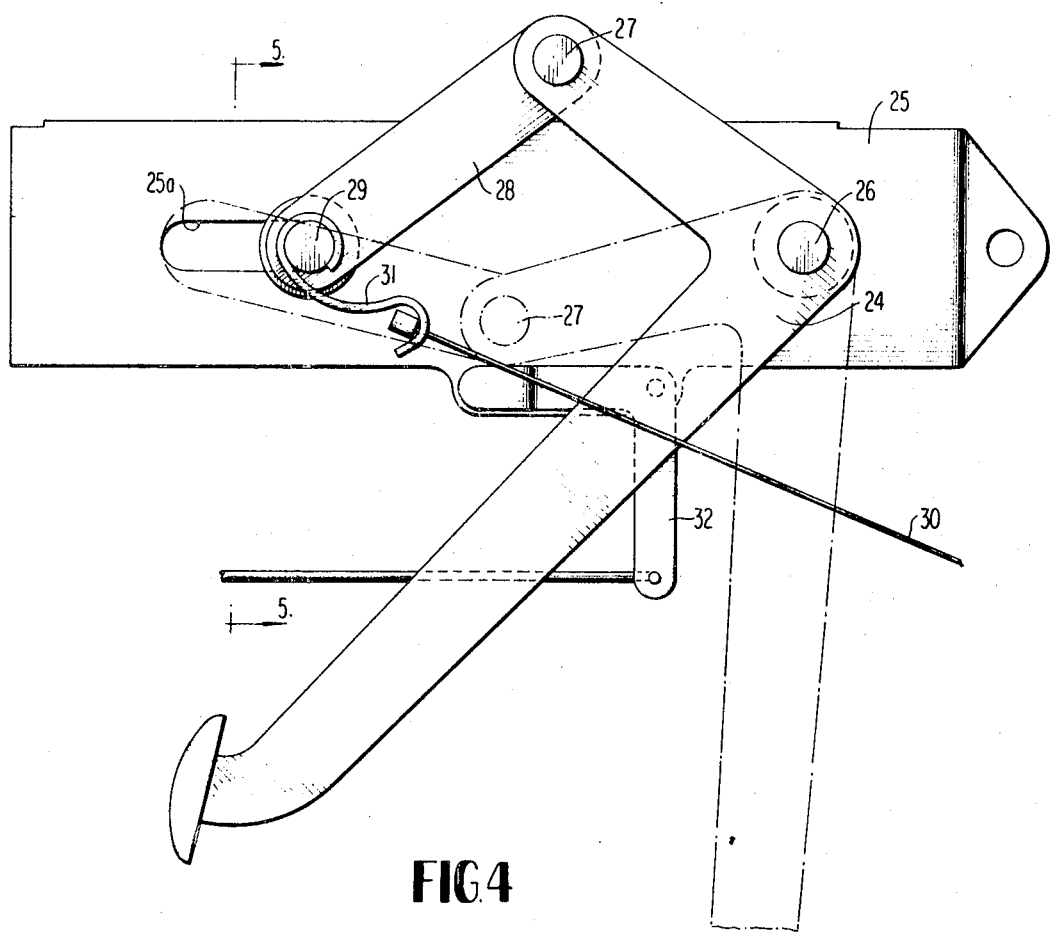
FIG. 4 is a side elevational view of a still another embodiment of the brake actuating mechanism of the present invention, the solid lines illustrating the mechanism in the released position, the locked position being illustrated in phantom.

A further embodiment of the brake actuating mechanism of the present invention is illustrated in FIGS. 3 and 4 wherein the foot pedal includes a bell-crank lever 24 pivotally connected to the bracket 25 as at 26. The end of the shorter leg of the bell-crank lever is pivotally connected as at 27 to one end of a lever 28 having its opposite end connected to a transverse pin 29 extending through and slidable within an elongated slot 25a formed in the bracket. The resilient connection between the lever 28 and the brake actuating cable 30 is provided by a leaf spring 31 having one end secured to the pin 29 and the opposite end connected to the end of the cable 30.

The released position of the toggle linkage is shown in solid lines in FIG. 4, and the locked position in phantom, wherein the movable pivot 27 is disposed on one side of the center line of the fixed pivot 26. A bell-crank release lever 32 is pivoted to the bracket to move the pivot 27 to the opposite, released side of the center line of the fixed pivot 26.

It is to be understood that the forms of the invention herewith shown and described are to be taken as preferred examples of the same, and that various changes in the shape, size and arrangement of parts may be resorted to, without departing from the spirit of the invention or scope of the subjoined claims.

We claims

1. In a vehicle emergency brake actuating mechanism of the type including a foot pedal lever and a brake actuating cable, the improvement comprising an over-center type toggle linkage operatively connected between the foot pedal lever and the brake actuating cable, whereby pressure can be applied to the emergency brake pedal to selectively brake the vehicle in a manner similar to the conventional hydraulic brake system, or to fully actuate the emergency brake by forcing the toggle linkage to the over-center locked position.

2. A vehicle emergency brake actuating mechanism according to claim 1, wherein the foot pedal lever is pivotally connected to a fixed bracket, the pivotal connection of the foot pedal lever to the bracket forming the fixed pivot of the toggle linkage, and a lever pivotally connected to the end portion of the foot pedal lever, the pivotal connection of the lever to the foot pedal lever forming the movable pivot of the toggle linkage, whereby when the movable pivot is disposed on one side of the center line of the fixed pivot the foot pedal lever is in the released position, and when the movable pivot is disposed on the opposite side of the center line of the fixed pivot the foot pedal lever is in the locked position.

3. A vehicle emergency brake actuating mechanism according to claim 2, wherein a release lever is pivotally connected to the bracket and adapted to engage the toggle linkage when said movable pivot is disposed on said opposite side of the fixed pivot, said release lever being movable to cam the toggle linkage to the one side of the center line of the fixed pivot to release the foot pedal lever.

4. A vehicle emergency brake actuating mechanism according to claim 2, wherein the end of the brake actuating cable is secured to one end of said lever, the tension in said cable maintaining the movable pivot on said opposite side of the center line of the fixed pivot when disposed thereat.

5. A vehicle emergency brake actuating mechanism according to claim 4, wherein a resilient connector is mounted between the lever and the end of the brake actuating cable to thereby insure constant tension on the brake system to compensate for variations of length within the system due to extreme temperature variations, or varying chassis load conditions.

6. A vehicle emergency brake actuating mechanism according to claim 5, wherein the resilient connector comprises a rubber block secured to said lever, said cable extending through said block and held therein by a nut washer assembly threaded on the end portion of the cable.

7. A vehicle emergency brake actuating mechanism according to claim 5, wherein the resilient connector comprises a leaf spring having one end connected to the end of the brake actuating cable and the opposite end connected to said lever.

8. A vehicle emergency brake actuating mechanism according to claim 4, wherein said lever and said foot pedal lever are disposed on one side of said bracket, an elongated slot formed in said bracket, a transverse pin connected to the end of said lever and extending through said slot, the end of said brake actuating cable being operatively connected to said pin.

9. In a vehicle brake actuating mechanism of the type including a foot pedal lever and associated linkage including a lever connected to a brake actuating cable, the improvement comprising, a rubber block mounted between the end of the brake actuating cable and the lever to thereby insure constant tension on the brake system to compensate for variations of length within the system due to extreme temperature variations, or varying chassis load conditions, said rubber block being secured to said lever, and said cable extending through said rubber block and held therein by a nut washer assembly threaded on the end portion of the cable.

10. In a vehicle brake actuating mechanism of the type including a foot pedal lever and associated linkage including a lever connected to a brake actuating cable, the improvement comprising, a leaf spring having one end connected to the end of the brake actuating cable and the opposite end connected to said lever, to thereby insure constant tension on the brake system to compensate for variations of length within the system due to extreme temperature variations, or varying chassis load conditions.

* * * * *